No. 878,832. PATENTED FEB. 11, 1908.
A. M. SMITH.
HOOF PAD HOLDER.
APPLICATION FILED MAY 1, 1907.

Witnesses
Inventor
Adam M. Smith
By Enoin & Wheeler
Attorneys

UNITED STATES PATENT OFFICE.

ADAM M. SMITH, OF WHITEWATER, WISCONSIN.

HOOF-PAD HOLDER.

No. 878,832.　　　Specification of Letters Patent.　　　Patented Feb. 11, 1908.

Application filed May 1, 1907. Serial No. 371,332.

*To all whom it may concern:*

Be it known that I, ADAM M. SMITH, a citizen of the United States, residing at Whitewater, State of Wisconsin, have invented new and useful Improvements in Hoof-Pad Holders, of which the following is a specification.

My invention relates to improvements in hoof pad holders for retaining a medicated or moist pad in contact with the bottom of a horse's hoof when inflamed or sore for the purpose of cooling the same or removing irritation therefrom, and it pertains more especially among other things to the means for adjusting the pad holder for hoofs of different sizes and for securing the holder in connection with a hoof whereby a pad holder of a given size may be readily adjusted to fit a great variety of sizes of hoofs, and the necessity of manufacturing a large number of different sizes of pad holders for different sizes of hoofs is thereby avoided.

Figure 1:
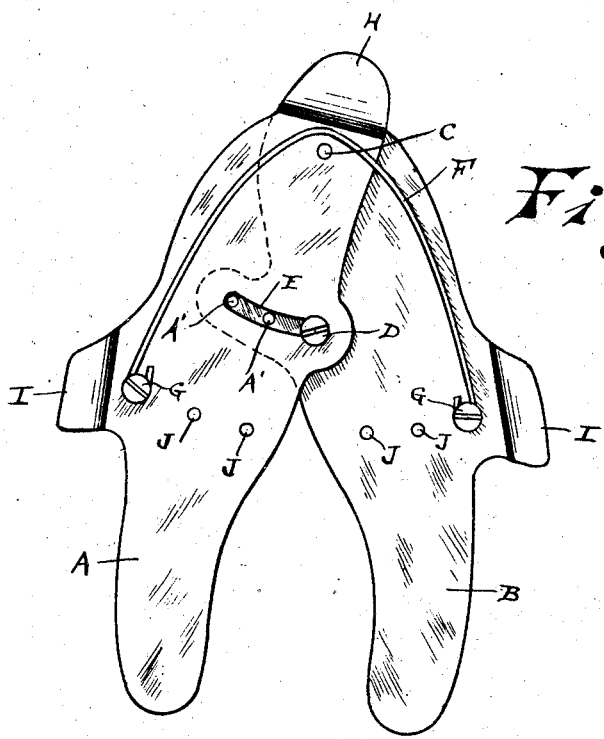
Figure 2:
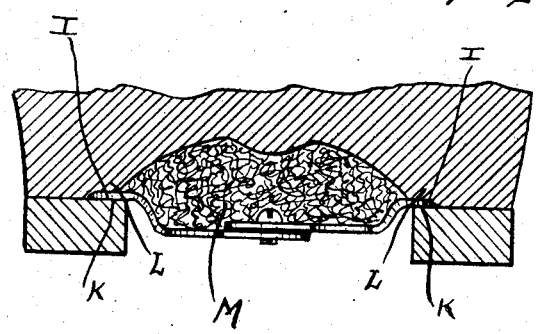

My invention is further explained by reference to the accompanying drawings in which, Figure 1 is a bottom view thereof, and Fig. 2 is an end view thereof in connection with the hoof of a horse.

Like parts are identified by the same reference letters in both views.

My device comprises two members A and B which are formed of sheet metal and pivotally connected together at one end by a pin or rivet C and the two opposing edges of the members A and B are slidably connected together near their centers by the screw D operating in the slot E. The lower end of the screw D has screw threaded bearings in the member B, while its opposite end extends through the slot E. To facilitate in adjusting the members A and B at various distances apart as may be required to adapt the device to horses' hoofs of different sizes I provide the member B with a plurality of screw threaded apertures A' for the reception of the screw D. Thus it is obvious that when desirous to separate the members A and B, the screw D will be removed from the aperture in which it is shown and placed in one of the other apertures A'.

F represents a bow-spring which is adjustably connected at its respective ends to the respective members A and B by the screws G, G, which screws are provided with screw threaded bearings in said members. To provide for changing the adjustment of said bow-spring in relation to said members A and B, I have provided each of said members with a plurality of screw threaded apertures J, J, whereby it is obvious that when desirous to adjust the members A and B for a larger hoof the screws G are removed from the apertures in which they are shown as being connected and connected with the members in one of the other apertures J, J.

The members A and B are each provided with laterally projecting lugs I, I which are adapted to be inserted between the respective sides of a horse's shoe K and the hoof L of a horse, as shown in Fig. 2, while the member A is provided with a forward projection H which is adapted to be inserted between the toe or front of the shoe and the horse's hoof, whereby the holder is securely retained in place beneath the horse's hoof. The lugs I and I are curved downwardly from their outer ends whereby a space is formed between the members A and B and the bottom of the hoof L for the reception of a pad M as shown in Fig. 2.

Preparatory to inserting the pad holder the respective members A and B are compressed together so that the lugs I, I, may enter beneath the opposing edges of a shoe. They are then forced outwardly in the position indicated in Fig. 2 when they are retained in place by the resilient action of the bow-spring F.

Having thus described my invention what I claim as new and desire to secure by Letters Patent is,

1. A hoof pad holder of the class described comprising two members provided with laterally projecting lugs and means for pivotally connecting together said members at one end, one of said members being provided with a plurality of apertures for the reception of a connecting screw, a screw rigidly affixed at one end in one of said apertures the opposite member being provided with an elongated slot for the reception of said screw, and a bow spring connected at its respective ends with said pivotally connected members.

2. A hoof pad holder of the class described comprising two members provided with laterally projecting lugs and means for pivotally connecting together said members at one end, one of said members being provided with a plurality of apertures for the reception of a connecting screw, a screw rigidly affixed at one end in one of said apertures, the opposite member being provided with an elongated slot for the reception of said screw, and a bow spring adjustably connected at its respective ends with said pivotally connected members.

In testimony whereof I affix my signature in the presence of two witnesses.

ADAM M. SMITH.

Witnesses:
 JAS. B. ERWIN,
 M. M. SCHULZ.